United States Patent [19]
Shingai

[11] Patent Number: 6,126,395
[45] Date of Patent: Oct. 3, 2000

[54] AXIAL FAN

[75] Inventor: Hiroyuki Shingai, Tokyo, Japan

[73] Assignee: Kabushiki Kaisha Copal, Tokyo, Japan

[21] Appl. No.: 09/238,162

[22] Filed: Jan. 28, 1999

[30] Foreign Application Priority Data

Jan. 30, 1998 [JP] Japan .................................. 10-019826

[51] Int. Cl.$^7$ ....................................................... F01D 1/02
[52] U.S. Cl. .................. 415/200; 415/208.2; 416/241 A
[58] Field of Search ................................. 415/200, 208.2,
415/191, 220, DIG. 915; 416/229 R, 230,
241 A, 219 A, 220 A, 221, 204 R, 223 R,
DIG. 5

[56] References Cited

U.S. PATENT DOCUMENTS

| | | | |
|---|---|---|---|
| 1,408,715 | 3/1922 | Seelig et al. | 415/208.2 |
| 3,551,070 | 12/1970 | Glucksman | 416/91 |
| 4,682,065 | 7/1987 | English et al. | 310/90 |
| 5,217,351 | 6/1993 | Meier et al. . | |
| 5,221,184 | 6/1993 | Gesenhues et al. | 415/216.1 |

FOREIGN PATENT DOCUMENTS 8-334100  12/1996  Japan .
10-089290  4/1998  Japan .

*Primary Examiner*—Edward K. Look
*Assistant Examiner*—Rhonda Barton
*Attorney, Agent, or Firm*—Burns, Doane, Swecker & Mathis, LLP

[57] ABSTRACT

An impeller includes a vane component integrally molded with a plurality of vanes having predetermined tilt angles that change continuously from a central portion of rotation, and a bottomed cylindrical component formed with a rotating shaft body, so that the vanes have an ideal shape with tilt angles that match the rotational peripheral velocity. For this purpose, the impeller of an axial fan serves as a rotor arranged to be rotatable with respect to a stator fixed to a main body of the axial fan. The impeller includes a bottomed cylindrical component formed by injection molding from a predetermined resin material such that a shaft body axially supported by a rotary bearing of the main body is formed at a central portion of rotation thereof, and a vane component formed by injection molding from a predetermined resin material such that a plurality of vanes are equidistantly formed thereon.

11 Claims, 5 Drawing Sheets

AXIAL FAN

BACKGROUND OF THE INVENTION

The present invention relates to an axial fan and, more particularly, to an axial fan having an impeller that can obtain a sufficiently large air flow and air pressure despite its compact, flat shape.

In an axial fan, an impeller is supported to be rotatable about a stator on the main body side of the axial fan. The impeller is formed by equidistantly arranging a plurality of vanes on the outer circumferential surface of a rotor having an annular permanent magnet on its inner circumference. When a rotating magnetic field is generated in the stator, the permanent magnet is attracted thereto so as to rotate the impeller. When the impeller is rotated at a predetermined rotation speed, a desired air flow and air pressure are generated by the vanes. Since the axial fan can be made compact and flat, it is incorporated mainly in more recent electronic equipment, which is also formed compact and flat, so as to prevent an increase in temperature caused by the heat which is generated by internal electronic circuit boards and the like, thereby protecting the electronic elements.

Further downsizing and flattening of the axial fan are demanded in order to cope with recent size reduction of electronic equipment.

The reduction in air flow and air pressure, that naturally arises upon such downsizing and flattening, is not allowable. Therefore, various proposals have been made in order to ensure a large air flow and air pressure.

"A Compact Blower" disclosed in U.S. Pat. No. 5,217,351 is a proposal for performing downsizing and flattening while ensuring an acceptable air flow and air pressure. According to this proposal, extending portions that extend the vanes of the rotor of an axial fan to the central portion of rotation are integrally molded by injection molding using a resin or the like. Due to the function of the extending portions formed in this manner, a decrease in air flow, caused by a decrease in the outer diameter of the vanes of the rotor and in the area of the vanes as the result of downsizing, can be prevented.

According to this proposal, of the plurality of vanes formed on the outer circumferential surface of the impeller of the axial fan, the extending portions formed to extend to the central portion of rotation are continuously molded to form under-molding portions in the mold.

Therefore, the slide piece of the mold that forms the under-molding portions for the vanes is pulled out from the central portion of rotation of the base portion of the impeller in parallel to the radial direction. As a result, the mold becomes rather complicated and accordingly very expensive. A so-called multi-cavity mold for molding a large number of impellers by one injection molding operation has a very complicated structure and is difficult to realize.

When the slide piece that forms the under-molding portion side for the vanes of the impeller is pulled out from the mold in the radial direction, the slide piece cannot be pulled out by twisting. Therefore, it is impossible to form vanes at an angle in accordance with the rotating peripheral velocity of the vanes, and the vanes cannot be formed into an ideal form.

A curved surface is formed on the outer circumferential surface of the base portion of the impeller that forms the under-molding portions for the vanes, so that air supplied by the under-molding portions of the vanes during rotation is supplied to the vanes on the outer circumferential side. The area of the vanes forming the under-molding portions sharply decreases at a portion closer to the central portion of rotation of the base portion. Therefore, the flow of air cannot be reliably captured by the vanes at the under-molding portions formed in this manner.

Since the curved surface is formed on the outer circumferential surface of the base portion of the impeller, the permanent magnet to be incorporated is limited to flat one, and the structure of the rotor is accordingly largely limited.

SUMMARY OF THE INVENTION

The present invention has been made in view of the problems described above. An object of the present invention to provide an impeller with a vane component integrally molded with a plurality of vanes having predetermined tilt angles that change continuously from the central portion of rotation, and a bottomed cylindrical component formed with a rotating shaft body, so that an axial fan having an impeller, the tilt angles of the vanes of which match the rotational peripheral velocity, can be provided.

In order to solve the above problems and to achieve the above object, according to the present invention, there is provided an axial fan comprising an impeller serving as a rotor arranged to be rotatable with respect to a stator fixed to a main body of the axial fan. The impeller includes a bottomed cylindrical component formed by molding from a predetermined resin material such that a shaft body axially supported by a rotary bearing of the main body is formed at a central portion of rotation thereof, and a vane component formed by molding from a predetermined resin material such that a plurality of vanes are formed thereon.

There is also provided an axial fan comprising an impeller serving as a rotor arranged to be rotatable with respect to a stator fixed to a main body of the axial fan. The impeller includes a bottomed cylindrical component formed by molding from a predetermined resin material, such that a shaft body axially supported by a rotary bearing of the main body is formed at a central portion of rotation thereof and so as to have a first stationary portion, and a vane component formed by molding from a predetermined resin material, such that a plurality of vanes are formed thereon and so as to have a second stationary portion fixed on the first stationary portion.

There is also further provided an axial fan comprising an impeller serving as a rotor arranged to be rotatable with respect to a stator fixed to a main body of the axial fan. The impeller includes a bottomed cylindrical component formed by molding from a predetermined resin material, such that a metal shaft body axially supported by a rotary bearing of the main body is formed at a central portion of rotation thereof by molding and so as to have a substantially arcuate curved surface portion, formed to extend from the central portion of rotation to a side surface portion, and a first stationary portion, and a vane component formed by molding from a predetermined resin material, such that a plurality of vanes, having portions that correspond to the curved surface portion without a gap, are formed thereon and so as to have a second stationary portion fixed on the first stationary portion.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

The preferred embodiment of the present invention will be described with reference to the accompanying drawings.

Figure 1:
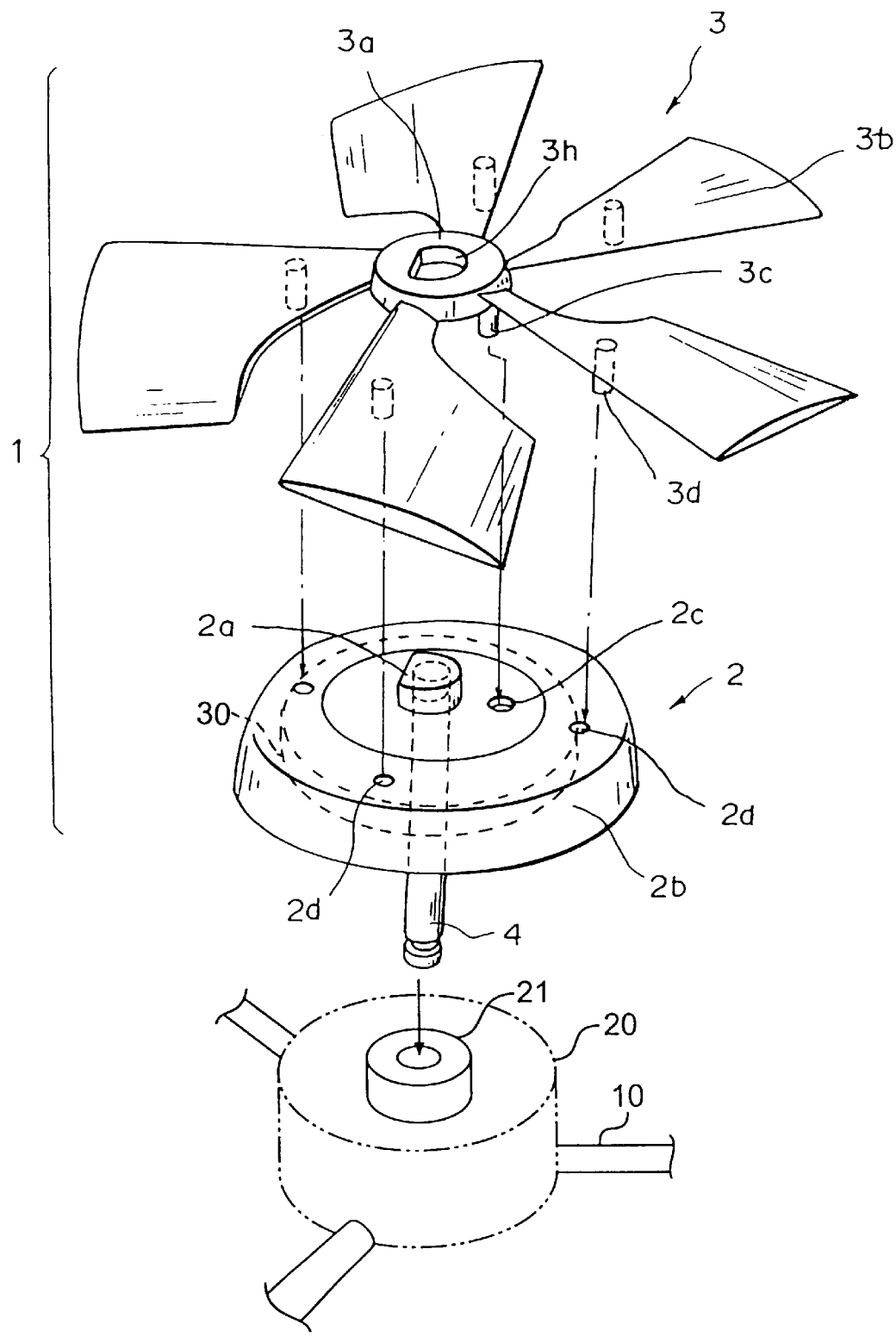
FIG. 1 is a perspective view of the outer appearance showing how to assemble an impeller 1.

FIG. 1 is a stereoscopic exploded view of an impeller 1 serving as a rotor arranged to be rotatable with respect to a stator 20 fixed to a main body 10 of an axial fan. Referring to FIG. 1, two components, i.e., a bottomed cylindrical component 2 and a vane component 3, are assembled to form the impeller 1. The cylindrical component 2 is integrally formed such that a metal shaft body 4 axially supported by a rotary bearing 21 of the main body 10 is formed at the central portion of rotation by insert molding thereof. The vane component 3 is integrally formed with a plurality of vanes 3b, as shown in FIG. 1.

In the bottomed cylindrical component 2, a first mounting portion or shape portion 2a is formed having a D-cut shape protecting upward from where the shaft body 4 extends vertically, as shown in FIG. 1. This first mounting portion or shape portion 2a is fitted in a second mounting portion or hole portion 3h of the vane component 3 by close fitting, and is pressed into it. The cylindrical component 2 and vane component 3 are thereby mounted on each other and integrally fit such that their centers of rotation coincide with each other. When the impeller 1 is compact, it can be sufficiently formed by press-fitting.

When the impeller 1 is large, a projection 3c, serving as a mounting portion to enter a hole portion 2c formed in the cylindrical component 2 at a position shown in FIG. 1, is further integrally formed near the hole portion 3h. Since a further fixing portion is thus formed, the above fitting state is further enhanced. In this case, since positioning is performed with the projection 3c and hole portion 2c, the D-cut portion of the shape portion 2a becomes unnecessary. However, this D-cut portion may remain, and need not be removed.

Five vanes 3b are equidistantly, integrally molded on the outer circumferential surface of a shape portion 3a formed with the hole portion 3h radially as shown in FIG. 1. When the impeller 1 is a larger one, projections 3d are respectively formed on the lower surface side of the vanes 3b, as indicated by broken lines. These projections 3d may be fitted in through hole portions or hole portions 2d formed in the bottomed cylindrical component 2, to further secure the fitting state. After fitting, adhesion using an adhesive, ultrasonic caulking, or welding may be performed. In this state, the impeller 1 cannot be distinguished from a monolithic component based upon its outer appearance. An outer circumferential surface 2b of the cylindrical component 2 is formed to have a predetermined curved surface, as shown in FIG. 1, so that gas or air smoothly flows on it.

Figure 2:
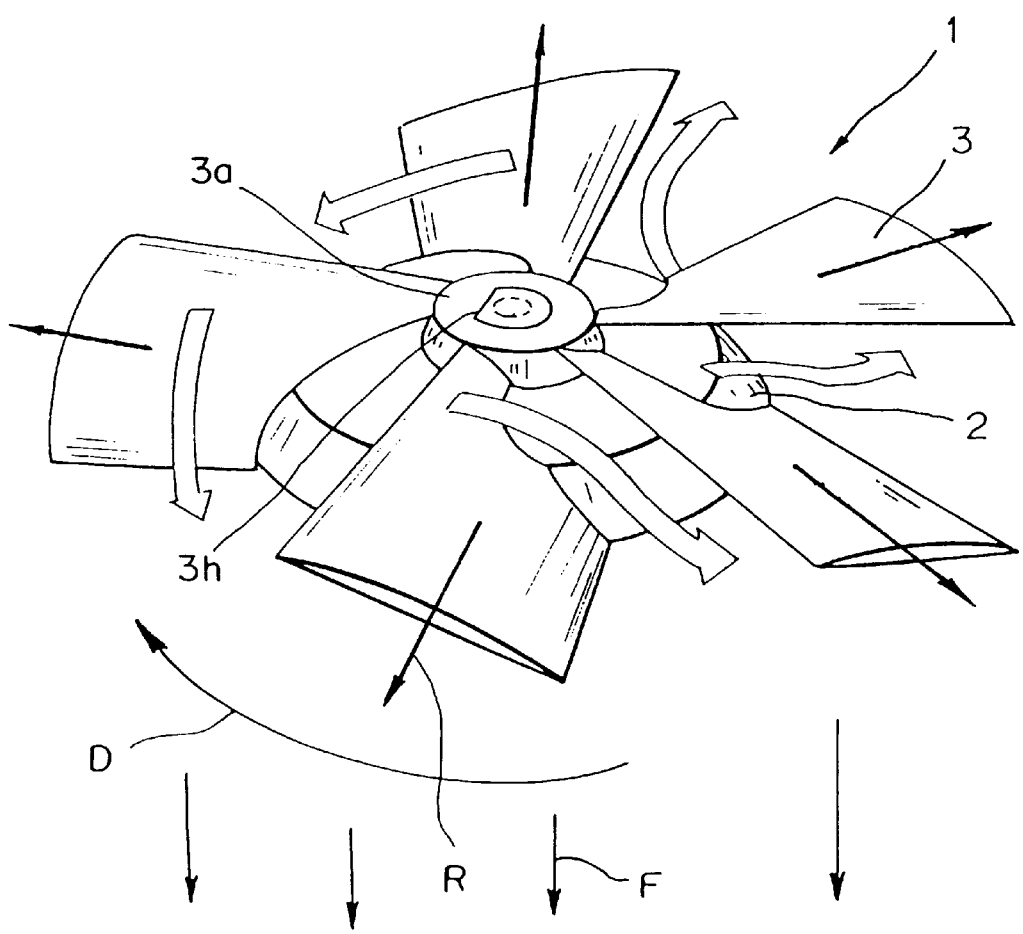
FIG. 2 is a view for explaining the operation of the completed impeller 1.

FIG. 2 is a perspective view of the outer appearance showing a state wherein the impeller 1 completed in the above manner is set on the stator 20 of the axial fan and is rotated to produce a flow of gas or air. As shown in FIG. 2, as the impeller 1 is rotated in the direction of an arrow D, an air flow as indicated by white arrows in FIG. 2 generates a flow of air in the direction of arrows F.

At this time, an air flow is also generated in the direction of arrows R, which is the radial direction of the vanes 3b. Since this flow is not directed in the direction of the arrows F but becomes a loss, it is captured on the lower side of the vane component 3, as will be described later.

Figure 3A:
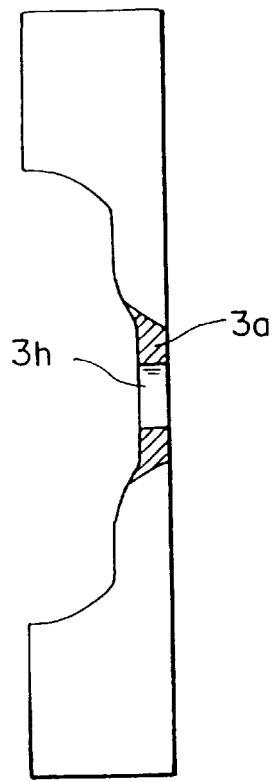
FIGS. 3A to 3D are views showing the outer shape of a vane component 3.
Figure 3B:
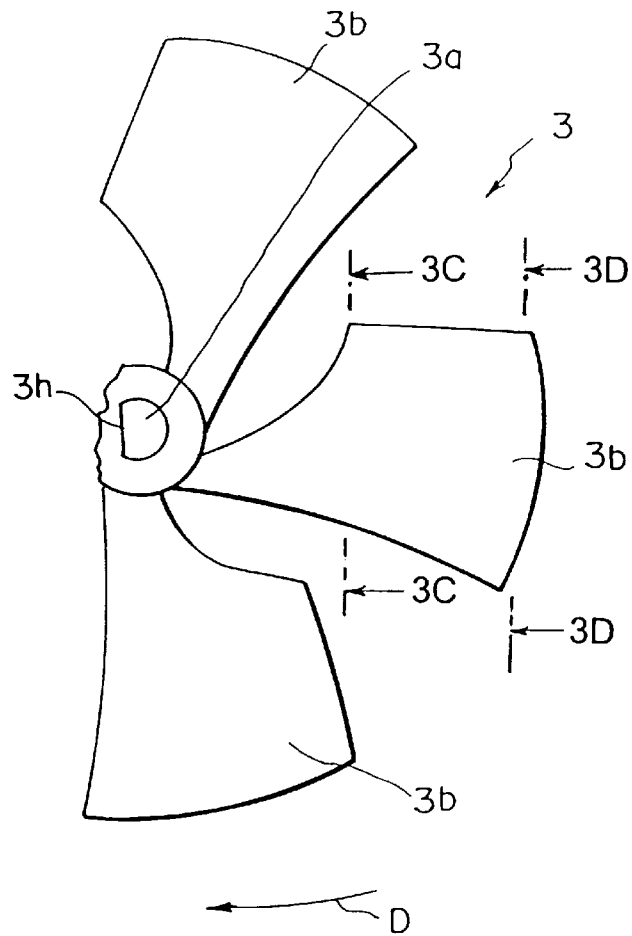
Figure 3C:
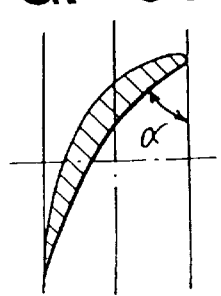
Figure 3D:
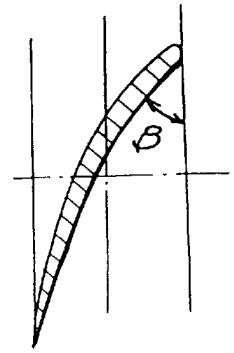

FIG. 3A is a sectional view of the vane component 3 taken along its center, FIG. 3B is a front view of the vane component 3, and FIGS. 3C and 3D include sectional views taken along the lines 3C—3C, and 3D—3D, respectively, of FIG. 3B.

Referring to FIGS. 3C and 3D, the vane 3b is continuously formed at tilt angles as mounting angles α and β with respect to a plane perpendicularly intersecting the center of rotation, and is continuously formed to be slightly twisted. The tilt angles of the vane 3b are selected such that the velocity of the gas or air in the axial direction at the central portion of rotation and that at the outer peripheral portion become substantially equal. Conventionally, when the cylindrical component and vane component are to be integrally molded by using molds, five slide pieces that are radially, reciprocally moved from the center of rotation are required. However, in the present invention, since the molds have no under portions at all, as will be described later, these slide pieces become unnecessary.

Figure 4A:
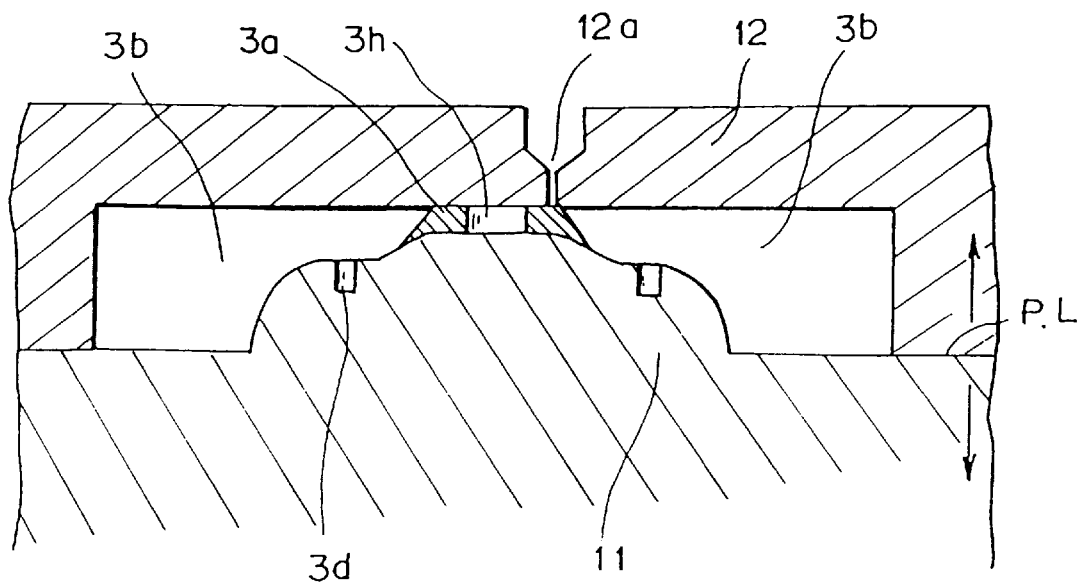
FIGS. 4A and 4B are sectional views of the main part of molds for the vane component and a bottomed cylindrical component, respectively.
Figure 4B:
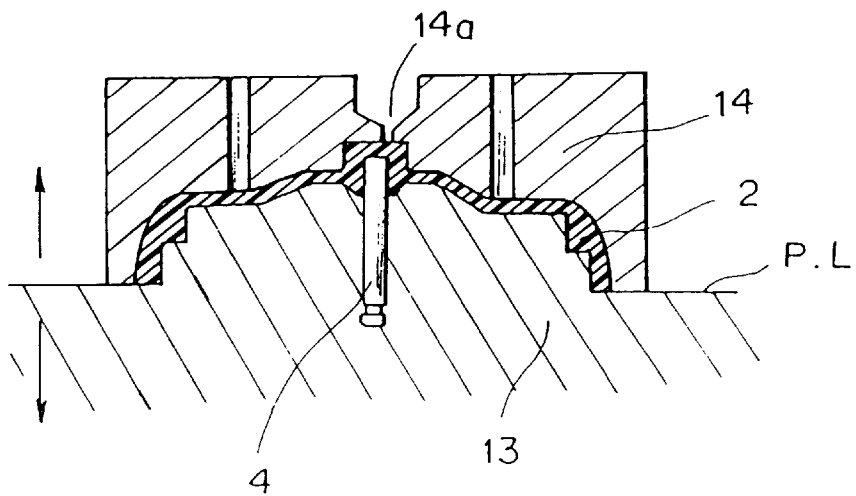

FIGS. 4A and 4B are sectional views of the main part of the molds, in which FIG. 4A shows the first mold for molding the vane component 3, and FIG. 4B shows the second mold for molding the bottomed cylindrical component 2.

First, referring to FIG. 4A, the plurality of vanes 3b, the shape portions 3a, and the projections 3d are integrally molded. The vanes are formed with predetermined tilt angles that become substantially equal between the central portion of rotation and the outer peripheral portion, as described above, with the shape portions 3a serving as the mounting portions. For this purpose, a cavity having the shape shown in FIG. 4A is formed in an upper mold 12 and a lower mold 11 so as not to form under-molding portions. A molten resin is injected into the cavity through a gate 12a of the upper mold 12. After the resin is set, the molds are opened and the product is released from the cavity with an ejector pin (not shown), thereby molding the vane component 3 from a predetermined resin material.

Referring to FIG. 4B, the bottomed cylindrical component 2 is molded by a cavity formed by an upper mold 14 and a lower mold 13 that constitute the second mold. For this purpose, the shaft body 4 is set in the cavity in advance, and a molten resin is injected into the cavity through a gate 14a. After the resin is set, the molds are opened and the product is released from the cavity with an ejector pin (not shown).

Since the first and second molds described above do not have under portions, their upper and lower molds can be parted from each other at a parting surface P.L. in the direction of the illustrated arrows, and the molded product can be extracted in the parting directions.

Figure 5A:
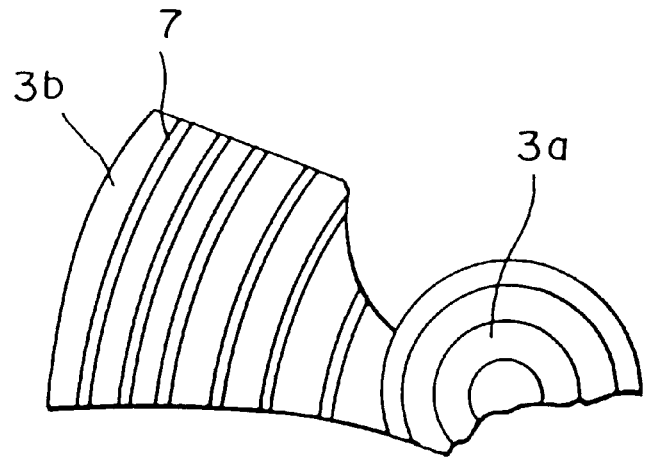
FIGS. 5A and 5B are front views of the vane component.
Figure 5B:
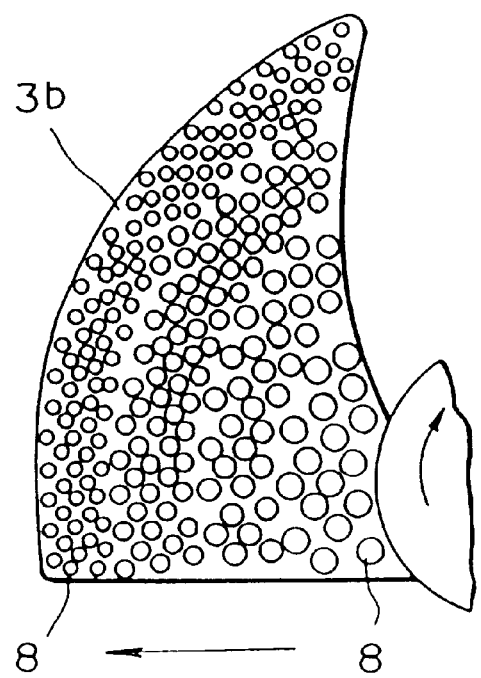

FIGS. 5A and 5B are front views of the vanes of the vane component 3. FIG. 5A shows a state wherein shape portions in the form of grooves 7 are molded in the surface of each vane at intervals that become gradually dense in the outer peripheral direction, so that the gas or air flowing in the outer peripheral direction is directed in the rotational direction. FIG. 5B shows a state wherein shape portions in the form of dimples 8 comprising spherical recesses in the shape portion are formed in the surface of each vane such that their intervals gradually increase and their diameters gradually decrease in the outer peripheral direction, so that the gas flowing in the outer peripheral direction is directed in the rotational direction.

The present invention is not limited to the above embodiment, but various types of variations may be practiced. For example, the number of vanes is not limited to five, and the size of the vanes can range from small to large. The shape of the vanes can be changed depending on the shapes of the permanent magnet 30 to be incorporated, a magnetic soft-iron member for constituting a closed magnetic circuit, and the like, as a matter of course.

As described above, according to the present invention, a vane component integrally molded with a plurality of vanes continuously formed at predetermined tilt angles, and a bottomed cylindrical component formed with a rotating shaft body are prepared as separate components and are assembled together, so that an axial fan having an impeller, the angles of the vanes of which match the rotational peripheral velocity of the vanes, as a rotor can be provided. As a result, a decrease in air flow and air pressure that accompanies downsizing and flattening of the impeller and is difficult to avoid can be prevented.

What is claimed is:

1. An axial fan comprising:
an impeller serving as a rotor arranged to be rotatable with respect to a stator fixed to a main body of said axial fan, said impeller having a permanent magnet therein, and said impeller further including:
a bottomed cylindrical component having a substantially convex arcuate surface portion formed by molding from a predetermined resin material such that a shaft body axially supported by a rotary bearing of said main body is formed at a central portion of rotation thereof, and
a vane component formed by molding from a predetermined resin material such that a plurality of vanes are radially formed thereon, wherein each said vane is continuously formed to be twisted from an outer peripheral portion to said substantially convex arcuate surface portion with predetermined tilt angles such that an axial velocity of a gas determined by a mounting angle of said vane with respect to a plane perpendicularly intersecting said central portion of rotation becomes substantially equal between said central portion of rotation and said outer peripheral portion of said vanes because of different tilt angles.

2. The axial fan according to claim 1, wherein said vane component is molded from a predetermined resin material by using a first mold having no under-molding portion, and said bottomed cylindrical component is molded by using a second mold having no under-molding portion.

3. An axial fan comprising:
an impeller serving as a rotor arranged to be rotatable with respect to a stator fixed to a main body of said axial fan, said impeller having a permanent magnet therein, and said impeller further including:
a bottomed cylindrical component formed by molding from a predetermined resin material such that a shaft body axially supported by a rotary bearing of said main body is formed at a central portion of rotation thereof, and a vane component formed by molding from a predetermined resin material such that a plurality of vanes are formed thereon,
wherein shape portions are molded, on a surface of said vane component, at intervals that gradually increase in an outer peripheral direction, so that a gas flowing in the outer peripheral direction is directed in a rotational direction.

4. An axial fan comprising:
an impeller with a permanent magnet therein serving as a rotor arranged to be rotatable with respect to a stator fixed to a main body of said axial fan, said impeller further including:
a bottomed cylindrical component formed by molding from a predetermined resin material, such that a shaft body axially supported by a rotary bearing of said main body is formed at a central portion of rotation thereof and so as to have a first mounting portion, and
a vane component formed by molding from a predetermined resin material, such that a plurality of vanes are radially formed thereon and so as to have second mounting portions to be fixed on said first mounting portions, wherein each said vane is continuously formed to be twisted from an outer peripheral portion with predetermined tilt angles such that an axial velocity of a gas determined by a mounting angle of said vane with respect to a plane perpendicularly intersecting said central portion of rotation becomes substantially equal between said central portion of rotation and said outer peripheral portion of said vanes because of different tilt angles.

5. The axial fan according to claim 4, wherein said vane component is molded from a predetermined resin material by using a first mold having no under-molding portion, and said bottomed cylindrical component is molded by using a second mold having no under-molding portion.

6. An axial fan comprising:
an impeller with a permanent magnet therein serving as a rotor arranged to be rotatable with respect to a stator fixed to a main body of said axial fan, said impeller further including:
a bottomed cylindrical component formed by molding from a predetermined resin material, such that a shaft body axially supported by a rotary bearing of said main body is formed at a central portion of rotation thereof and so as to have first mounting portions, and
a vane component formed by molding from a predetermined resin material, such that a plurality of vanes formed radially and so as to have second mounting portions fixable onto said first mounting portions, wherein shape portions are molded, on a surface of said vane component, at intervals that gradually increase in an outer peripheral direction, so that a gas flowing in the outer peripheral direction is directed in a rotational direction.

7. An axial fan comprising an impeller with a permanent magnet therein serving as a rotor arranged to be rotatable with respect to a stator fixed to a main body of said axial fan, said impeller further including:
a bottomed cylindrical component having a substantially convex arcuate surface portion formed by molding from a predetermined resin material, such that a metal shaft body axially supported by a rotary bearing of said main body is fixed at a central portion of rotation thereof by molding and so as to have said substantially convex arcuate curved surface portion formed to extend from said central portion of rotation to a side surface portion, and a first mounting portion, and
a vane component formed by molding from a predetermined resin material, such that a plurality of vanes are formed radially thereon, wherein each said vane is continuously formed to be twisted from an outer peripheral portion to said substantially convex arcuate surface portion without a gap, and so as to have a second mounting portion for fixing on said first mounting portion.

8. The axial fan according to claim 7, wherein shape portions are molded, on a surface of said vane component, at intervals that gradually increase in an outer peripheral direction, so that a gas flowing in the outer peripheral direction is directed in a rotational direction.

9. The axial fan according to claim 7, wherein said vane component is molded from a predetermined resin material by using a first mold having no under-molding portion, and said bottomed cylindrical component is molded by using a second mold having no under-molding portion.

10. The axial fan according to claim 7, wherein said first mounting portion is a projection formed into a projecting shape at the central portion of rotation, and said second mounting portion is a portion formed with a hole portion to fit on said projection.

11. The axial fan according to claim 7, wherein said first mounting portion is a hole portion formed in said curved surface portion, and said second mounting portion is a projection formed to fit into said hole portion.

* * * * *